(12) United States Patent
Chang

(10) Patent No.: US 10,208,955 B2
(45) Date of Patent: Feb. 19, 2019

(54) CERAMIC AND METAL ENGINE COMPONENTS WITH GRADIENT TRANSITION FROM METAL TO CERAMIC

(71) Applicant: United Technologies Corporation, Hartford, CT (US)

(72) Inventor: Hoyt Y. Chang, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 683 days.

(21) Appl. No.: 14/680,856

(22) Filed: Apr. 7, 2015

(65) Prior Publication Data

US 2016/0298842 A1 Oct. 13, 2016

(51) Int. Cl.
| | |
|---|---|
| *F23R 3/00* | (2006.01) |
| *B32B 3/26* | (2006.01) |
| *B32B 15/04* | (2006.01) |
| *B32B 18/00* | (2006.01) |
| *F02C 3/04* | (2006.01) |

(52) U.S. Cl.
CPC .............. *F23R 3/007* (2013.01); *B32B 3/266* (2013.01); *B32B 15/04* (2013.01); *B32B 18/00* (2013.01); *F02C 3/04* (2013.01); *F23R 2900/00018* (2013.01)

(58) Field of Classification Search
CPC ........................ F23R 3/002; F23R 3/007; F23R 2900/00018; B32B 3/26; B32B 3/266; B32B 15/04; B32B 18/00; F02C 3/04

USPC ..................................................... 60/752, 753
See application file for complete search history.

(56) References Cited

U.S. PATENT DOCUMENTS

| | | | | |
|---|---|---|---|---|
| 4,030,875 A | * | 6/1977 | Grondahl | F23C 3/00 60/753 |
| 4,628,694 A | * | 12/1986 | Kelm | B21D 35/00 60/752 |
| 6,322,897 B1 | * | 11/2001 | Borchert | B22F 3/1109 428/469 |
| 2011/0005231 A1 | * | 1/2011 | Low | F23R 3/14 60/740 |
| 2014/0250894 A1 | * | 9/2014 | Petty, Sr. | F23R 3/60 60/754 |

FOREIGN PATENT DOCUMENTS

| | | |
|---|---|---|
| EP | 1806431 | 7/2007 |
| EP | 2589872 | 5/2013 |

OTHER PUBLICATIONS

Extended European Search Report dated Aug. 17, 2016 in European Application No. 16164215.2.

* cited by examiner

*Primary Examiner* — Phutthiwat Wongwian
*Assistant Examiner* — Loren Edwards
(74) *Attorney, Agent, or Firm* — Snell & Wilmer, L.L.P.

(57) ABSTRACT

A combustor is provided. The combustor may comprise a shell including a ceramic material. A gradient transition from ceramic to metal may have a predominantly ceramic side coupled to the shell. A metal mating surface may also be coupled to a predominantly metal side of the gradient transition from ceramic to metal.

14 Claims, 4 Drawing Sheets

CERAMIC AND METAL ENGINE COMPONENTS WITH GRADIENT TRANSITION FROM METAL TO CERAMIC

FIELD OF INVENTION

The present disclosure relates to gas turbine engines, and, more specifically, to an engine component having ceramic and metal portions with a gradient transition from ceramic to metal.

BACKGROUND

Gas turbine engines typically comprise combustion sections operating at high temperatures. Materials used in hot sections of an engine may be selected based on their high-temperature characteristics. Some ceramic materials have good high temperature characteristics, but ceramics are also brittle. Mounting points for ceramic components may break when subjected to stress.

SUMMARY

A combustor may comprise a shell including a ceramic material. A gradient transition from ceramic to metal may have a predominantly ceramic side coupled to the shell. A metal mating surface may also be coupled to a predominantly metal side of the gradient transition from ceramic to metal.

In various embodiments, the shell and the gradient transition from ceramic to metal may be formed integrally with additive manufacturing. The metal mating surface may be configured to receive a fastener. The ceramic material may comprise at least one of silicon oxide or silicon carbide. The gradient transition may include a blend of a nickel-chromium-based alloy and the ceramic material. A bulkhead may comprise a ceramic body and a second gradient transition from ceramic to metal. The bulkhead may further comprise a second metal mating surface coupled to the second gradient transition from ceramic to metal, and the second metal mating surface may be adjacent the first metal mating surface. A stress relief opening may be at least partially defined by the metal mating surface.

A blended structure may comprise a metal portion at least partially defining a stress relief opening and a gradient transition portion formed integrally with the metal portion. A ceramic portion may also be formed integrally with the gradient transition portion. The gradient transition portion may include a percent by weight of ceramic material defined by a smooth function of position along the gradient transition portion. The smooth function may comprise at least one of a linear, logarithmic, exponential, or quadratic function. The stress relief opening may be at least partially defined by the gradient transition portion. The ceramic portion may comprise silicon oxide or silicon carbide. The gradient transition may comprise a blend of a nickel-chromium-based alloy and the ceramic material. The metal portion may be configured to receive a fastener.

A gas turbine engine may comprise a compressor configured to rotate about an axis and a turbine aft of the compressor. The turbine may be configured to drive the compressor. A combustor may be disposed between the compressor and turbine. The combustor may comprise a combustor inner shell including a first metal mating flange and a first ceramic body with a first gradient transition between the first metal mating flange and the first ceramic body. The combustor may also include a combustor outer shell disposed radially outward from the combustor inner shell. The combustor outer shell may comprise a second metal mating flange and a second ceramic body with a second gradient transition between the second metal mating flange and the first ceramic body. A bulkhead may be coupled to the combustor inner shell and the combustor outer shell.

In various embodiments, the first gradient transition comprises a blend of a nickel-chromium-based alloy and a ceramic material. The first ceramic body may comprise silicon oxide or silicon carbide. A stress relief opening may be at least partially defined by the mating flange. The gradient transition may include a percent by weight of ceramic material defined by a smooth function of position along the gradient transition. The smooth function may comprise at least one a linear function, a logarithmic function, an exponential function, or a quadratic function.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Combustor sections in gas turbine engines may operate at high temperatures. Materials forming combustor walls and other components exposed to high temperatures are typically capable of withstanding high operating temperatures. Ceramics offer high temperature capabilities, but may be somewhat rigid and brittle compared to metallic components. As described herein, ceramic and metal portions of components may be combined using a transition portion that blends between metal and ceramic. A combustor section comprising ceramic portions, metal portions, and one or more gradient transition portions between the metal and ceramic portions may be provide enhanced thermal capabilities, as discussed in further detail below.

Figure 1:
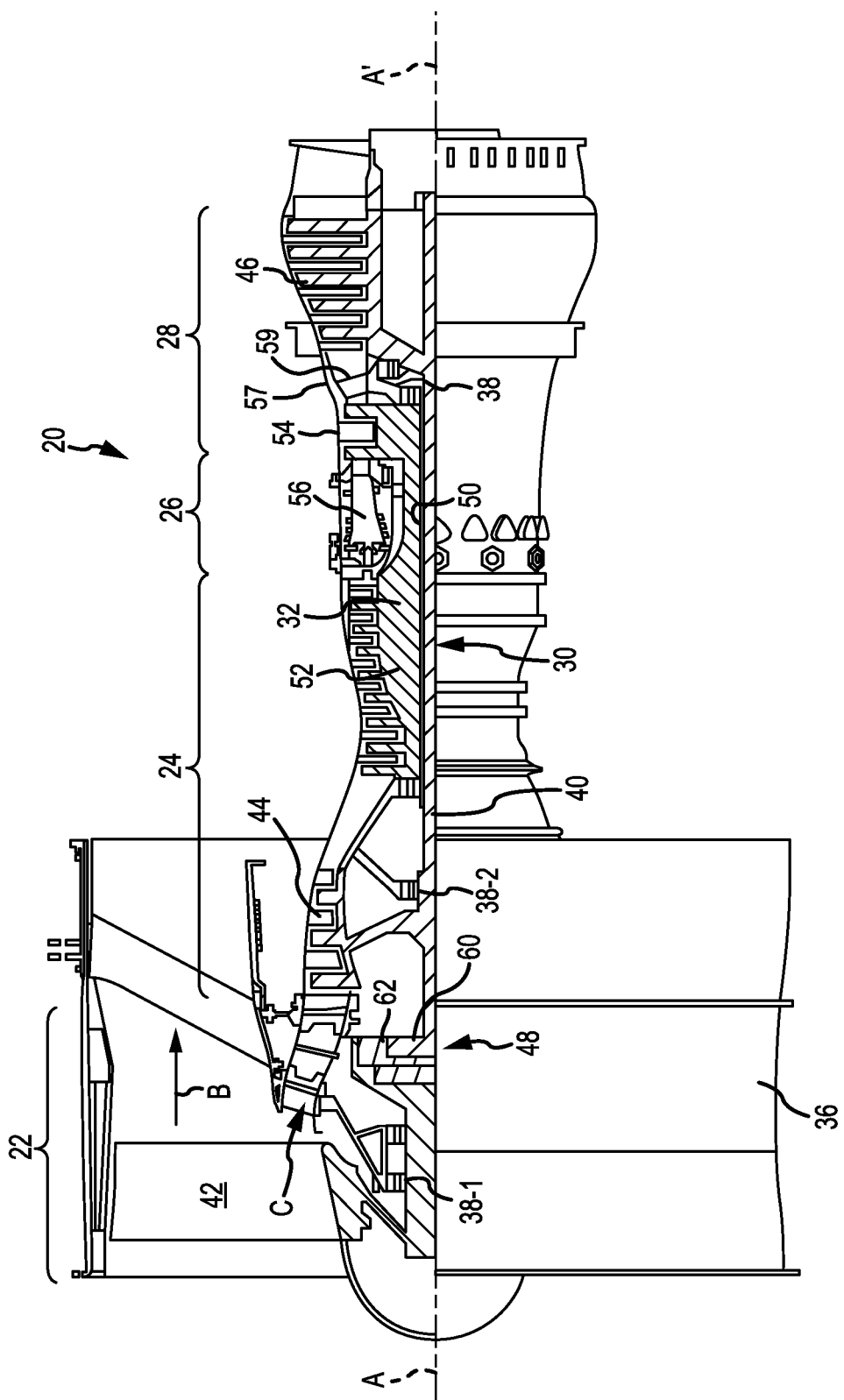
FIG. 1 illustrates a cross-sectional view of an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. Diffuser case 55 may be disposed around combustor 56. An air cooling system may extract air from diffuser case 55 and deliver the air to cool disks in high pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46 to extract energy from the burned mixture. Mid-turbine frame 57 includes airfoils 59 which are in the core airflow path. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
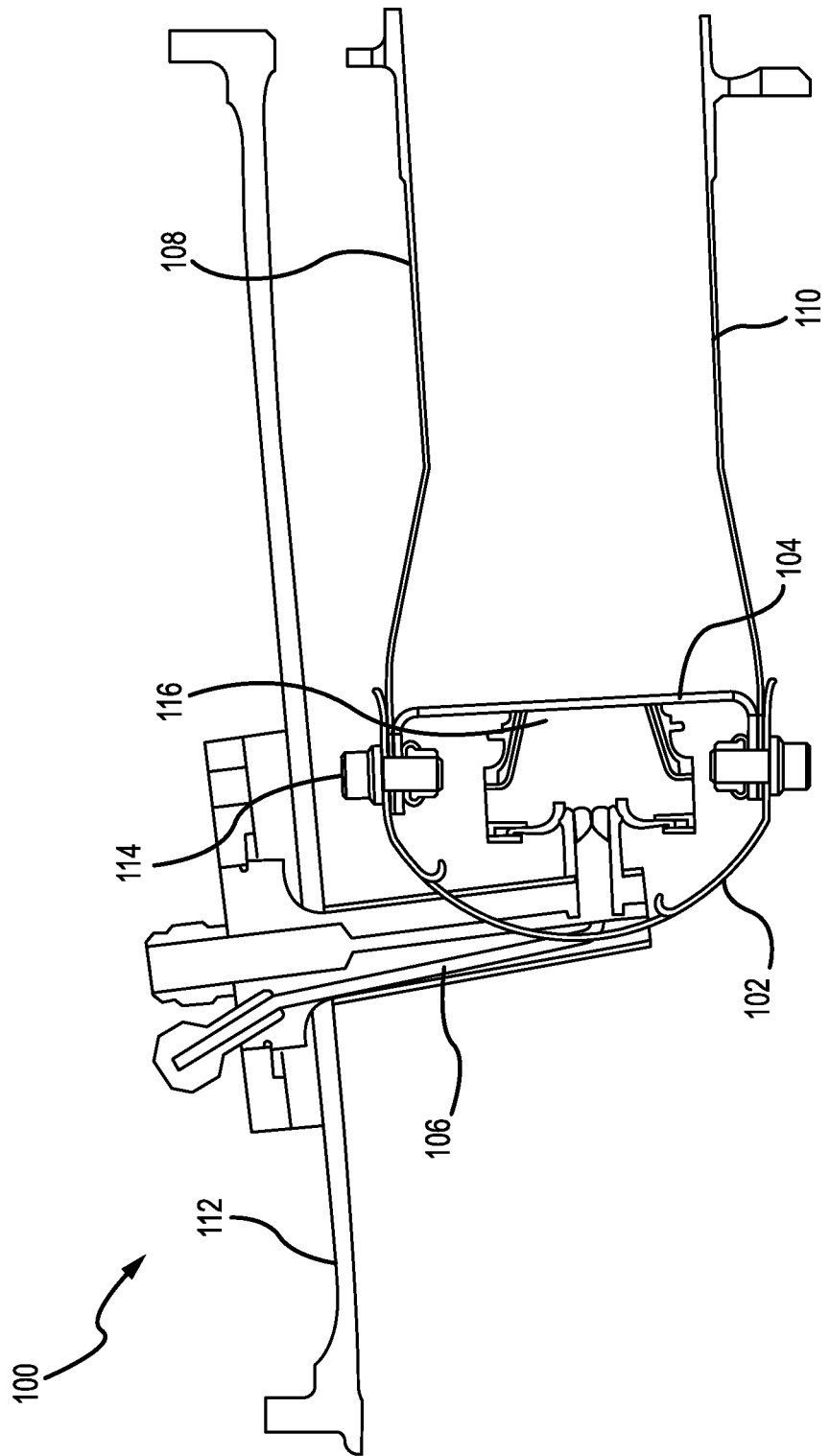
FIG. 2 illustrates a cross sectional view of a combustor disposed in a diffuser case, in accordance with various embodiments.

With reference to FIG. 2, a cross sectional view of a combustor 100 is the same as combustor 56 of FIG. 1. Combustor 100 may include hood 102 located forward of bulkhead 104. Fuel nozzle 106 delivers fuel through hood 102 and into combustor 100. Outer combustor shell 108 and inner combustor shell 110 are disposed aft of hood 102 and bulkhead 104 with outer diffuser case 112 radially outward from outer combustor shell 108. Fasteners 114 may be bolts configured to couple hood 102, bulkhead 104, outer combustor shell 108, and inner combustor shell 110. The outer combustor shell, inner combustor shell, and bulkhead may comprise ceramic segments and metal segments with gradient transition sections connecting each respective segment.

Figure 3:
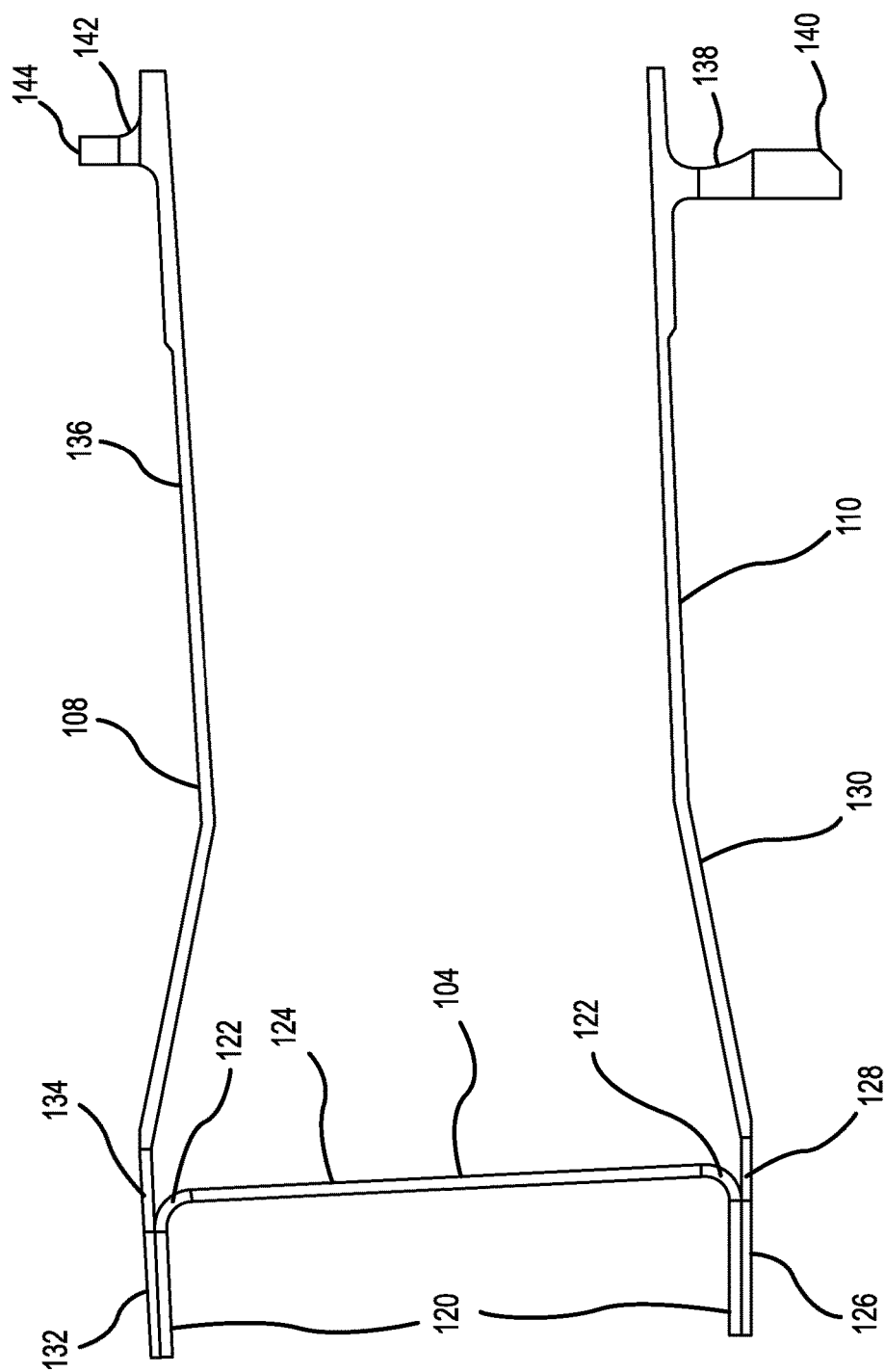
FIG. 3 illustrates a cross sectional view of a combustor shell and bulkhead with ceramic and metal sections joined by a ceramic-to-metal gradient transition, in accordance with various embodiments.

With reference to FIG. 3, an outer combustor shell 108, an inner combustor shell 110, and a bulkhead 104 are shown, in accordance with various embodiments. Bulkhead 104 may include mating flanges 120 made of an austenitic nickelchromium-based alloy such as that sold under the trademark Inconel® which is available from Special Metals Corporation of New Hartford, N.Y., USA. Mating flanges 120 may provide a mating surface to fasten bulkhead 104 to other structures. A body 124 of bulkhead 104 may be disposed aft of mating flanges 120 and coupled to mating flanges 120 by a gradient transition 122.

In various embodiments, body 124 may comprise a ceramic material (e.g., silicon oxide, silicon carbide, other carbides, or any ceramic material). The ceramic material of body 124 may be blended into the metal of mating flange 120 across gradient transition 122. Gradient transition 122 may be 100% metal on a side joined to mating flange 120 and 100% ceramic on a side joined to body 124. Gradient transition 122 may have a percent by weight of metal defined by a smooth function of position along gradient transition 122. Gradient transition 122 may also have a smooth function of percent by weight of ceramic material relative to position along gradient transition 122. For example, the transition from metal to ceramic may be linear, logarithmic, exponential, quadratic, or any other smoothly defined and continuous function. The gradient transition 122 may thus reduce the stress caused by differences in the coefficient of thermal expansion (CTE) between the ceramic material of body 124 and the metal material of mating flange 120.

In various embodiments, inner combustor shell 110 may comprise a mating flange 126. Mating flange 126 may be a mating flange similar to mating flange 120 or bulkhead 104. In that regard, mating flange 126 may be made of an austenitic nickel-chromium-based alloy such as that sold under the trademark Inconel® which is available from Special Metals Corporation of New Hartford, N.Y., USA. Mating flange 126 may provide a mating surface to fasten inner combustor shell 110 to other structures.

In various embodiments, inner combustor shell 110 may comprise a body 130 made of ceramic material. The ceramic material of body 124 may be silicon oxide or silicon carbide, for example. A gradient transition 128 may blend from the ceramic material of body 124 to the metal of mating flange 126 in the same manner as gradient transition 122 described above. Inner combustor shell 110 may also comprise a gradient transition 138 between metallic mounting structure 140 and the ceramic material of body 130.

In various embodiments, outer combustor shell 108 may comprise a mating flange 132 similar to mating flange 126 of inner combustor shell 110 and mating flanges 120 of bulkhead 104. Outer combustor shell 108 may further include body 136 made of ceramic material and similar to body 130 of inner combustor shell 110. Outer combustor shell 108 may further include a gradient transition 134 blending from ceramic material of body 136 to metal material of mating flange 132. Outer combustor shell 108 may also comprise a gradient transition 142 between metallic mounting structure 144 and the ceramic material of body 136, similar to gradient transition 138 of inner combustor shell 110.

Figure 4:
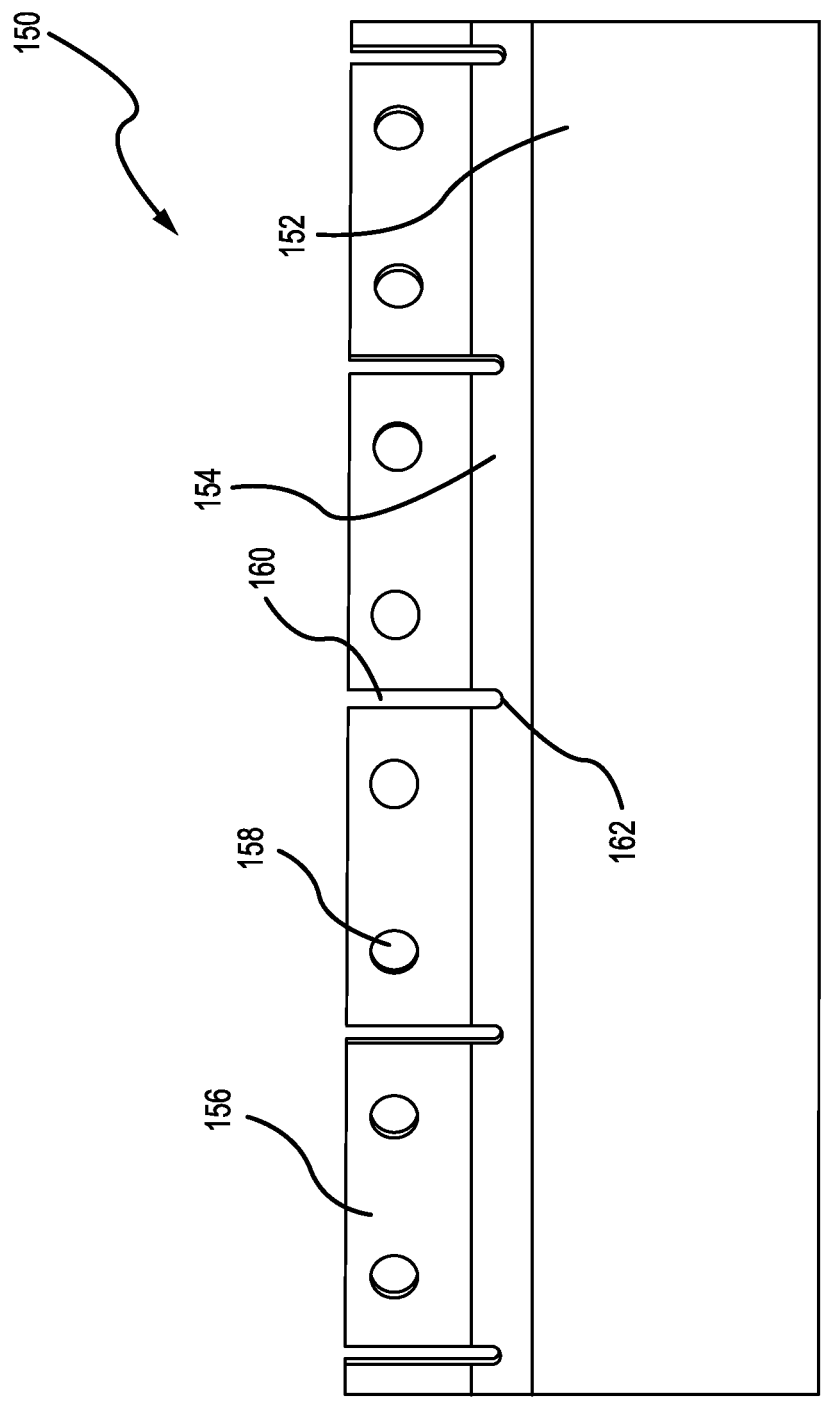
FIG. 4 illustrates a structure with ceramic and metal sections joined by a ceramic-to-metal gradient transition, in accordance with various embodiments.

With reference to FIG. 4, blended structure 150 is shown having ceramic portion 152 and metal portion 156 joined by a gradient transition portion 154, in accordance with various embodiments. Blended structure 150 may be a structure such as the inner combustor shell 110 (of FIG. 3), outer combustor shell 108 (of FIG. 3), or bulkhead 104 (also of FIG. 3), for example. Blended structure 150 may include metal portion 156 that has a 100% metal composition by weight. Metal portion 156 may also be a blended portion such that metal portion 156 is mostly metal. For example, metal portion may be 80% metal by weight and 20% ceramic by weight. Metal portion 156 may have greater ductility relative to ceramic portion 152. Blended structure 150 may also include ceramic portion 152. Ceramic portion 152 may be 100% ceramic in composition by weight. Ceramic portion 152 may also be mostly ceramic by composition. For example, ceramic portion 152 may be 80% ceramic by weight and 20% metal by weight. A gradient transition portion 154 may join ceramic portion 152 and metal portion 156. Gradient transition portion 154 may also have a smooth function of percent by weight of ceramic material relative to position along gradient transition portion 154. For example, the transition from metal to ceramic and/or from ceramic to metal may be linear, logarithmic, exponential, quadratic, or any other smoothly defined and continuous function.

In various embodiments, blended structure 150 may comprise stress relief slots 160. Stress relief slots 160 may be rectangular slots with a rounded end 162. Stress relief slots 160 may be at least partially defined by metal portion 156. Stress relief slots 160 are depicted as terminating at rounded end 162 in gradient transition portion 154, however relief slots may be formed in on or more of metal portion 156, gradient transition portion 154, and ceramic portion 152. Relief slots may be openings formed in blended structure 150 to relieve stress caused by a CTE differential between the ceramic material of ceramic portion 152 and the metal of metal portion 156. Blended structure may include bolt holes 158 in metal portion 156 to allow metal portion 156 to be coupled to another structure using fasteners (i.e., bolts).

In various embodiments, blended structure 150 may provide a ceramic portion 152 capable of operation in high temperature environments with a metal portion to provide a robust point of attachment to other structures. Blended structure 150 may be made using an additive manufacturing technique such as direct metal laser sintering, selective laser sintering, selective laser melting, electron-beam melting, or electron-beam freeform fabrication. Additive manufacturing enables gradient transition portion 154 to be created with a smooth transition from metal to ceramic. Additive manufacturing further allows gradient transition portion 154 to be formed integrally with the ceramic portion 152 and/or metal portion 156. In that regard, as each layer is made with additive manufacturing, the composition of the layer may be determined and the raw metal and ceramic material added.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor, comprising:
   a first combustor shell defining at least a portion of a combustion chamber, the first combustor shell comprising:
   a first shell body made of a first ceramic material, wherein the first ceramic material forms a radially inward surface and a radially outward surface of the first shell body, and wherein the radially inward surface of the first shell body is oriented toward the combustion chamber,
   a first mating flange extending axially and located forward of the first shell body, wherein the first mating flange is made of a first metal, and wherein the first metal forms a radially inward surface and a radially outward surface of the first mating flange, and
   a first gradient transition extending axially between the first ceramic material of the first shell body and the first metal of the first mating flange; and
   a bulkhead disposed forward of the first combustor shell, the bulkhead comprising:
   a bulkhead body extending radially and made of a second ceramic material, wherein the second ceramic material forms a forward surface and an aft surface of the bulkhead body,
   a first bulkhead mating flange extending axially and made of a second metal, wherein the second metal forms a radially inward surface and a radially outward surface of the first bulkhead mating flange, wherein the first bulkhead mating flange is the coupled to the first mating flange of the first combustor shell, and wherein the radially outward surface of the first bulkhead mating flange is oriented toward the radially inward surface of the first mating flange of the first shell body, and
   a second gradient transition extending between the second ceramic material of the bulkhead body and the second metal of the first bulkhead mating flange.

2. The combustor of claim 1, wherein the first shell body and the first gradient transition are formed integrally with additive manufacturing.

3. The combustor of claim 1, further comprising a fastener located through the first mating flange and the first bulkhead mating flange.

4. The combustor of claim 1, wherein the first ceramic material comprises at least one of silicon oxide or silicon carbide.

5. The combustor of claim 1, wherein the first gradient transition comprises a blend of a nickel-chromium-based alloy and the first ceramic material.

6. The combustor of claim 1, further comprising a second combustor shell disposed radially outward of the first combustor shell, the second combustor shell comprising:
   a second shell body made of a third ceramic material;
   a second mating flange extending axially and located forward of the second shell body, wherein the second mating flange is made of a third metal; and
   a third gradient transition extending from the third ceramic material of the second shell body to the third metal of the second mating flange.

7. The combustor of claim 6, wherein the bulkhead further comprises a second bulkhead mating flange coupled to the second mating flange of the second combustor shell.

8. The combustor of claim 1, further comprising a stress relief opening at least partially defined by the first metal of the first mating flange.

9. A gas turbine engine, comprising:
   a compressor configured to rotate about an axis;
   a turbine aft of the compressor and configured to drive the compressor; and
   a combustor between the compressor and the turbine, the combustor comprising:
   a first shell body including a first ceramic material, wherein the first ceramic material forms a radially inward surface and a radially outward surface of the first shell body;
   a first mating flange located forward of the first shell body and comprising a first metal, wherein the first metal forms a first surface of the first mating flange and a second surface of the first mating flange opposite the first surface of the first mating flange;
   a first gradient transition disposed between the first ceramic material of the first shell body and the first metal of the first mating flange;
   a bulkhead body located forward of the first shell body and comprising a second ceramic material, wherein the second ceramic material forms a forward surface and an aft surface of the bulkhead body;
   a first bulkhead mating flange coupled to the first mating flange, the first bulkhead mating flange comprising a second metal, wherein the second metal forms a first surface of the first bulkhead mating flange and a second surface of the first bulkhead mating flange opposite the first surface of the first bulkhead mating flange, and wherein the first surface of the first bulkhead mating flange is oriented toward the first surface of the first mating flange of the first shell body; and
   a second gradient transition disposed between the second ceramic material of the bulkhead body and the second metal of the first bulkhead mating flange.

10. The gas turbine engine of claim 9, wherein the first gradient transition comprises a blend of a nickel-chromium-based alloy and the first ceramic material.

11. The gas turbine engine of claim 9, wherein the first ceramic material comprises silicon oxide or silicon carbide.

12. The gas turbine engine of claim 9, further comprising a stress relief opening at least partially defined by at least one of the first metal or the second metal.

13. The gas turbine engine of claim 9, wherein the first gradient transition includes a percent by weight of the first ceramic material defined by a smooth function of position along the first gradient transition.

14. The gas turbine engine of claim 13, wherein the smooth function comprises at least one of a linear function, a logarithmic function, an exponential function, or a quadratic function.

* * * * *